US012266225B2

(12) United States Patent
Kawauchi et al.

(10) Patent No.: US 12,266,225 B2
(45) Date of Patent: Apr. 1, 2025

(54) ON-VEHICLE COMMUNICATION SYSTEM, SWITCH DEVICE, COMMUNICATION CONTROL METHOD, AND COMMUNICATION CONTROL PROGRAM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Takehiro Kawauchi, Osaka (JP); Akihito Iwata, Osaka (JP); Takeshi Hagihara, Yokkaichi (JP); Yasuhiro Yabuuchi, Yokkaichi (JP); Yuanjun Xian, Yokkaichi (JP); Makoto Mashita, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 917 days.

(21) Appl. No.: 16/975,931

(22) PCT Filed: Jan. 31, 2019

(86) PCT No.: PCT/JP2019/003299
§ 371 (c)(1),
(2) Date: Aug. 26, 2020

(87) PCT Pub. No.: WO2019/187613
PCT Pub. Date: Oct. 3, 2019

(65) Prior Publication Data
US 2020/0410785 A1    Dec. 31, 2020

(30) Foreign Application Priority Data

Mar. 26, 2018   (JP) .................................. 2018-058761

(51) Int. Cl.
*G07C 5/00* (2006.01)
*G07C 5/08* (2006.01)
(Continued)

(52) U.S. Cl.
CPC ........... *G07C 5/008* (2013.01); *G07C 5/0816* (2013.01); *H04L 12/40* (2013.01); *H04L 49/557* (2013.01);
(Continued)

(58) Field of Classification Search
CPC ....... G07C 5/008; G07C 5/0816; H04L 12/40; H04L 2012/40273; H04L 49/555; H04W 4/44
(Continued)

(56) References Cited

U.S. PATENT DOCUMENTS 5,600,630 A * 2/1997 Takano ............... H04L 49/3009
370/397
6,321,150 B1 * 11/2001 Nitta ...................... H04L 12/40
701/32.7
(Continued)

FOREIGN PATENT DOCUMENTS

CN    1531810 A    9/2004
CN    104363156 A    2/2015
(Continued)

*Primary Examiner* — Krishnan Ramesh
(74) *Attorney, Agent, or Firm* — Oliff PLC

(57) ABSTRACT

This on-vehicle communication system is an on-vehicle communication system including one or a plurality of switch devices each configured to relay data between a plurality of function units mounted to a vehicle. The on-vehicle communication system includes: a detection unit configured to detect an abnormality regarding a function unit; and a
(Continued)

change unit configured to, when an abnormality has been detected by the detection unit, perform a protocol change process of causing the function unit for which the abnormality has been detected, to change a protocol that is used.

7 Claims, 7 Drawing Sheets

(51) Int. Cl.
    *H04L 12/40*     (2006.01)
    *H04L 49/55*     (2022.01)
    *H04W 4/44*     (2018.01)

(52) U.S. Cl.
    CPC ..... *H04W 4/44* (2018.02); *H04L 2012/40273* (2013.01)

(58) Field of Classification Search
    USPC .......................................................... 701/32.7
    See application file for complete search history.

(56) References Cited

U.S. PATENT DOCUMENTS

| | | | |
|---|---|---|---|
| 8,358,578 B2* | 1/2013 | Murashige | H04L 67/12 370/252 |
| 2002/0099487 A1* | 7/2002 | Suganuma | B60R 16/0232 701/1 |
| 2003/0214417 A1* | 11/2003 | Peltz | B61L 25/028 340/4.3 |
| 2011/0075552 A1* | 3/2011 | Mitsumori | H04L 49/552 370/389 |
| 2011/0268435 A1* | 11/2011 | Mizutani | H04Q 11/0067 398/5 |
| 2012/0173900 A1* | 7/2012 | Diab | H04L 12/10 713/310 |
| 2012/0219003 A1* | 8/2012 | Cui | H04L 43/00 370/395.5 |
| 2014/0376561 A1* | 12/2014 | Armbruster | H04L 12/423 370/401 |
| 2015/0085645 A1* | 3/2015 | Kim | H04L 45/22 370/228 |
| 2015/0120161 A1* | 4/2015 | Kamiya | B60T 13/662 60/553 |
| 2015/0172173 A1* | 6/2015 | Mitsumori | H04L 45/247 370/225 |
| 2015/0226318 A1* | 8/2015 | Schmitt | F16H 61/0003 701/51 |
| 2015/0365255 A1* | 12/2015 | Gunther | H04L 65/80 370/401 |
| 2016/0173530 A1* | 6/2016 | Miyake | H04L 63/20 726/3 |
| 2017/0022015 A1* | 1/2017 | Göllü | G06K 7/1413 |
| 2017/0244594 A1* | 8/2017 | Shiota | H04W 12/122 |
| 2018/0255072 A1* | 9/2018 | Takada | H04L 12/66 |
| 2018/0278616 A1* | 9/2018 | Sakamoto | G06F 21/85 |
| 2019/0280913 A1* | 9/2019 | Huang | H04L 41/00 |
| 2019/0286507 A1* | 9/2019 | Grimm | G07C 5/0808 |
| 2019/0349394 A1* | 11/2019 | Kishikawa | H04L 63/1416 |
| 2019/0385057 A1* | 12/2019 | Litichever | H04L 63/14 |
| 2020/0128507 A1* | 4/2020 | Ryu | H04W 64/003 |
| 2020/0159180 A1* | 5/2020 | Ishigooka | G05B 9/03 |
| 2020/0269876 A1* | 8/2020 | Ando | B60W 60/0053 |

FOREIGN PATENT DOCUMENTS

| | | |
|---|---|---|
| JP | 2010-171910 A | 8/2010 |
| JP | 2010-272971 A | 12/2010 |
| JP | 2013-168865 A | 8/2013 |
| JP | 2014-232997 A | 12/2014 |
| JP | 2016-134717 A | 7/2016 |
| WO | 02/43342 A2 | 5/2002 |

* cited by examiner

FIG. 3

| | D0 | D1 | D2 | D3 | D4 | D5 | D6 | D7 | D8 |
|---|---|---|---|---|---|---|---|---|---|
| Symbol 0 | SNR<0> | SNR<1> | PinTx | PingRx | Reserved | Reserved | Reserved | Reserved | Even Parity |
| Symbol 1 | Message_Number<3:0> | | | | TogAck | Ack | Toggle | Valid | Odd Parity |
| Symbol 2 | Message<0><7:0> | | | | | | | | Odd Parity |
| Symbol 3 | Message<1><7:0> | | | | | | | | Odd Parity |
| Symbol 4 | Message<2><7:0> | | | | | | | | Odd Parity |
| Symbol 5 | Message<3><7:0> | | | | | | | | Odd Parity |
| Symbol 6 | Message<4><7:0> | | | | | | | | Odd Parity |
| Symbol 7 | Message<5><7:0> | | | | | | | | Odd Parity |
| Symbol 8 | Message<6><7:0> | | | | | | | | Odd Parity |
| Symbol 9 | Message<7><7:0> | | | | | | | | Odd Parity |
| Symbol 10 | CRC16 | | | | | | | First bit | Odd Parity |
| Symbol 11 | CRC16 | | | | | | | Final bit | Odd Parity |

ON-VEHICLE COMMUNICATION SYSTEM, SWITCH DEVICE, COMMUNICATION CONTROL METHOD, AND COMMUNICATION CONTROL PROGRAM

TECHNICAL FIELD

The present invention relates to an on-vehicle communication system, a switch device, a communication control method, and a communication control program.

This application claims priority on Japanese Patent Application No. 2018-58761 filed on Mar. 26, 2018, the entire content of which is incorporated herein by reference.

BACKGROUND ART

PATENT LITERATURE 1 (Japanese Laid-Open Patent Publication No. 2013-168865) discloses an on-vehicle network system as follows. That is, the on-vehicle network system includes: an on-vehicle control device having a memory that stores therein definition data defining a part, of a communication protocol used in an on-vehicle network, which depends on implementation on the on-vehicle network; and a communication protocol issuing device that issues the definition data to the on-vehicle control device. When the communication protocol issuing device receives, from a registration device that allows the on-vehicle control device to participate in the on-vehicle network, a registration request that requests participation of the on-vehicle control device in the on-vehicle network, the communication protocol issuing device performs authentication for the registration device, creates the definition data based on implementation on the on-vehicle network, and returns the definition data to the registration device. The registration device receives the definition data transmitted from the communication protocol issuing device, and requests the on-vehicle control device to store the received definition data in the memory. Then, the on-vehicle control device receives the definition data from the registration device, stores the definition data in the memory, and performs communication by using the on-vehicle network, based on the part, of the communication protocol, defined by the definition data.

CITATION LIST

Patent Literature

PATENT LITERATURE 1: Japanese Laid-Open Patent Publication No. 2013-168865

SUMMARY OF INVENTION (1) An on-vehicle communication system of the present disclosure includes one or a plurality of switch devices each configured to relay data between a plurality of function units mounted to a vehicle. The on-vehicle communication system includes: a detection unit configured to detect an abnormality regarding a function unit; and a change unit configured to, when an abnormality has been detected by the detection unit, perform a protocol change process of causing the function unit for which the abnormality has been detected, to change a protocol that is used.

(6) A switch device of the present disclosure includes: a switch unit configured to relay data between a plurality of function units mounted to a vehicle; a detection unit configured to detect an abnormality regarding a function unit; and a change unit configured to, when an abnormality has been detected by the detection unit, perform a protocol change process of causing the function unit for which the abnormality has been detected, to change a protocol that is used.

(7) A communication control method of the present disclosure is to be performed in an on-vehicle communication system including one or a plurality of switch devices each configured to relay data between a plurality of function units mounted to a vehicle. The communication control method includes the steps of: detecting an abnormality regarding a function unit; and performing, when an abnormality regarding the function unit has been detected, a protocol change process of causing the function unit for which the abnormality has been detected, to change a protocol that is used.

(8) A communication control program of the present disclosure is to be used in a switch device, the switch device including a computer and configured to relay data between a plurality of function units mounted to a vehicle. The communication control program causes the computer to function as: a detection unit configured to detect an abnormality regarding a function unit; and a change unit configured to, when an abnormality has been detected by the detection unit, perform a protocol change process of causing the function unit for which the abnormality has been detected, to change a protocol that is used.

One mode of the present disclosure can be realized not only as an on-vehicle communication system including such a characteristic processing unit, but also as a program for causing a computer to perform steps of such a characteristic process. One mode of the present disclosure can be realized as a semiconductor integrated circuit that realizes a part or the entirety of the on-vehicle communication system.

One mode of the present disclosure can be realized not only as a switch device including such a characteristic processing unit, but also as a method that has such a characteristic process as steps. One mode of the present disclosure can be realized as a semiconductor integrated circuit that realizes a part or the entirety of the switch device.

BRIEF DESCRIPTION OF DRAWINGS

FIG. 3 shows an example of an OAM frame to be used by the switch device according to the embodiment of the present disclosure.

DESCRIPTION OF EMBODIMENTS

Figure 1:
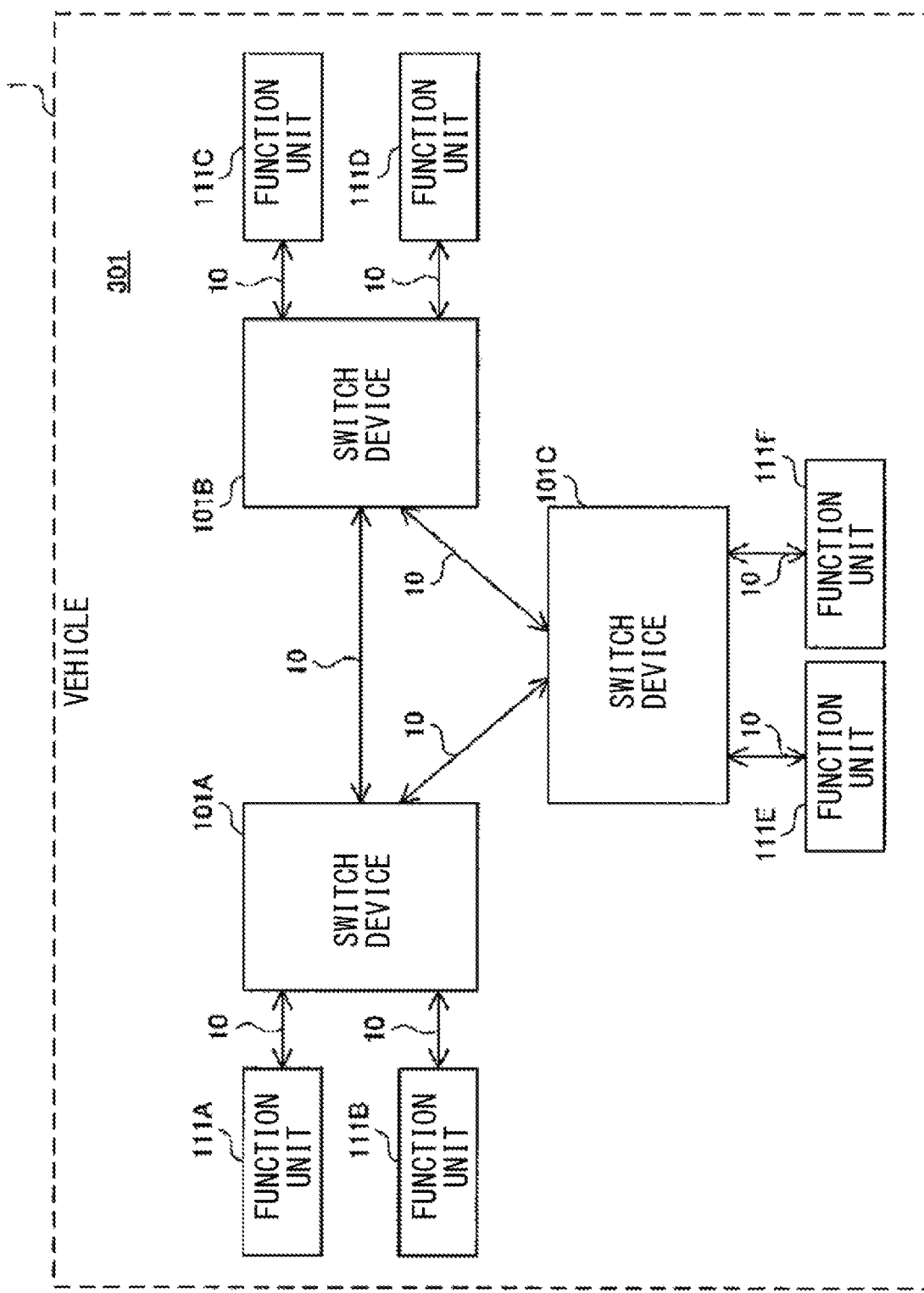
FIG. 1 shows a configuration of an on-vehicle communication system according to an embodiment of the present disclosure.

To date, on-vehicle network systems for improving security in on-vehicle networks have been developed.

Problems to be Solved by the Present Disclosure

The on-vehicle network disclosed in PATENT LITERATURE 1 is provided with a communication gateway for relaying communication data transmitted/received between on-vehicle ECUs (Electronic Control Units).

For example, as a method for detecting an abnormality of an on-vehicle ECU in the on-vehicle network described in PATENT LITERATURE 1, a method in which a communication gateway detects an abnormality of an on-vehicle ECU is conceivable.

However, even when an abnormality of an on-vehicle ECU has been detected, if recovery of the on-vehicle ECU takes time, the abnormal state continues, which could cause problems in processing of data to be used in driving support or automated driving.

The present disclosure has been made in order to solve the above problem. An object of the present disclosure is to provide an on-vehicle communication system, a switch device, a communication control method, and a communication control program that can realize stabler processing in an on-vehicle network.

Effects of the Present Disclosure

According to the present disclosure, stabler processing can be realized in an on-vehicle network.

DESCRIPTION OF EMBODIMENT OF THE PRESENT DISCLOSURE

First, contents of embodiments of the present disclosure are listed and described.

(1) An on-vehicle communication system according to the embodiment of the present disclosure includes one or a plurality of switch devices each configured to relay data between a plurality of function units mounted to a vehicle. The on-vehicle communication system includes: a detection unit configured to detect an abnormality regarding a function unit; and a change unit configured to, when an abnormality has been detected by the detection unit, perform a protocol change process of causing the function unit for which the abnormality has been detected, to change a protocol that is used.

Thus, due to the configuration of causing change of the protocol used by an abnormality function unit, which is a function unit for which an abnormality has been detected, the protocol used in the communication between the abnormality function unit and another function unit can be changed, and the other function unit can communicate with the abnormality function unit in accordance with the protocol after the change. Thus, the communication with the abnormality function unit can be continued. Therefore, stabler processing can be realized in the on-vehicle network.

(2) Preferably, each function unit operates in accordance with a model having a plurality of layers. When transmission/reception of predetermined information according to TCP (Transmission Control Protocol) with respect to the function unit has failed, the detection unit determines that the function unit has a TCP abnormality. As the protocol change process, the change unit causes the function unit determined to have the TCP abnormality, to change the protocol that is used, to another protocol that is used in the same layer out of the plurality of layers.

With this configuration, in a case where there is an abnormality in communication using TCP but communication according to a different protocol can be performed, communication with the abnormality function unit can be continued by using the protocol after the change.

(3) More preferably, each function unit operates in accordance with a model having a plurality of layers. When predetermined information in response to a ping (Packet INternet Groper) transmitted to a function unit by the switch device cannot be received from the function unit, the detection unit determines that the function unit has a ping abnormality. As the protocol change process, the change unit causes the function unit determined to have the ping abnormality, to perform communication according to a protocol that is used in a layer, out of the plurality of layers, at an order lower than that of the protocol being used by the function unit.

With this configuration, in a case where communication cannot be performed in the same layer but communication can be performed in a different layer, communication with the abnormality function unit can be continued by using the protocol after the change.

(4) Preferably, the detection unit detects a communication abnormality which is an abnormality in a communication path between the switch device to which the detection unit belongs and another switch device. The on-vehicle communication system further includes a path control unit configured to perform a path change process of switching the communication path for which the communication abnormality has been detected, to another communication path that passes through a different switch device.

With this configuration, data can be transmitted via a different switch device, and communication can be continued while the communication path having the communication abnormality is avoided.

(5) Preferably, the vehicle is a vehicle that performs automated driving.

With this configuration, communication between function units is allowed to continue in the vehicle, whereby automated driving can be stably continued.

(6) A switch device according to the embodiment of the present disclosure includes: a switch unit configured to relay data between a plurality of function units mounted to a vehicle; a detection unit configured to detect an abnormality regarding a function unit; and a change unit configured to, when an abnormality has been detected by the detection unit, perform a protocol change process of causing the function unit for which the abnormality has been detected, to change a protocol that is used.

Thus, due to the configuration of causing change of the protocol used by an abnormality function unit, which is a function unit for which an abnormality has been detected, the protocol used in the communication between the abnormality function unit and another function unit can be changed, and the other function unit can communicate with the abnormality function unit in accordance with the protocol after the change. Thus, the communication with the abnormality function unit can be continued. Therefore, stabler processing can be realized in the on-vehicle network.

(7) A communication control method according to the embodiment of the present disclosure is to be performed in an on-vehicle communication system including one or a plurality of switch devices each configured to relay data between a plurality of function units mounted to a vehicle. The communication control method includes the steps of:

detecting an abnormality regarding a function unit; and performing, when an abnormality regarding the function unit has been detected, a protocol change process of causing the function unit for which the abnormality has been detected, to change a protocol that is used.

Thus, due to the configuration of causing change of the protocol used by an abnormality function unit, which is a function unit for which an abnormality has been detected, the protocol used in the communication between the abnormality function unit and another function unit can be changed, and the other function unit can communicate with the abnormality function unit in accordance with the protocol after the change. Thus, the communication with the abnormality function unit can be continued. Therefore, stabler processing can be realized in the on-vehicle network.

(8) A communication control program according to the embodiment of the present disclosure is to be used in a switch device, the switch device including a computer and configured to relay data between a plurality of function units mounted to a vehicle. The communication control program causes the computer to function as: a detection unit configured to detect an abnormality regarding a function unit; and a change unit configured to, when an abnormality has been detected by the detection unit, perform a protocol change process of causing the function unit for which the abnormality has been detected, to change a protocol that is used.

Thus, due to the configuration of causing change of the protocol used by an abnormality function unit, which is a function unit for which an abnormality has been detected, the protocol used in the communication between the abnormality function unit and another function unit can be changed, and the other function unit can communicate with the abnormality function unit in accordance with the protocol after the change. Thus, the communication with the abnormality function unit can be continued. Therefore, stabler processing can be realized in the on-vehicle network.

Hereinafter, embodiments of the present disclosure will be described with reference to the drawings. In the drawings, the same or corresponding parts are denoted by the same reference signs, and the descriptions thereof are not repeated. At least some parts of the embodiments described below can be combined together as desired.

[Configuration and Basic Operation]

FIG. 1 shows a configuration of an on-vehicle communication system according to an embodiment of the present disclosure.

With reference to FIG. 1, an on-vehicle communication system 301 includes switch devices 101A, 101B, 101C, and function units 111A, 111B, 111C, 111D, 111E, 111F. The on-vehicle communication system 301 is mounted to a vehicle 1.

Hereinafter, each of the switch devices 101A, 101B, 101C is also referred to as a switch device 101, and each of the function units 111A, 111B, 111C, 111D, 111E, 111F is also referred to as a function unit 111.

In the following, the operation of a specific switch device 101 will be described as a representative, but the operations of the other switch devices 101 are also performed in the same manner.

In the following, the operation of a specific function unit 111 will be described as a representative, but the operations of the other function units 111 are also performed in the same manner.

The on-vehicle communication system 301 may not necessarily be provided with three switch devices 101, and may be provided with one, two, four, or more switch devices 101.

The on-vehicle communication system 301 may not necessarily be provided with six function units 111, but may be provided with two, three, four, five, seven, or more function units 111.

Each function unit 111 is, for example, an automated driving ECU (Electronic Control Unit), a driving support device, a sensor, or the like, and can communicate with the switch device 101. This allows the vehicle 1 to perform automated driving, for example.

The connection relationship between the switch devices 101 and the function units 111 in the on-vehicle communication system 301 of the vehicle 1 is fixed, for example.

The switch device 101 and the function unit 111 are connected to each other by, for example, an on-vehicle Ethernet (registered trademark) communication cable (hereinafter, also referred to as "Ethernet cable") 10.

For example, the function unit 111 operates in accordance with a model having a plurality of layers, such as OSI (Open Systems Interconnection) reference model. The switch device 101 and the function unit 111 communicate with each other by using an Ethernet cable 10. Communication data is communicated between the switch device 101 and the function unit 111 by using an Ethernet frame according to IEEE802.3, for example.

In the on-vehicle communication system 301, for example, the function units 111A, 111B, the function units 111C, 111D, and the function units 111E, 111F belong to different VLANs (Virtual Local Area Networks) from one another.

[Problem]

For example, in a case where 1000BASE-T1 is used in the on-vehicle communication system 301, the switch device 101 can make a failure notification of a function unit 111 using an OAM (Operations Administration Maintenance) frame.

Since the OAM frame is an existing frame, a protocol or a layer related to a failure can be notified of in a short time without tightening the communication band.

However, recovery of the function unit 111 often takes time, which could result in increased influence on various processes performed in the vehicle 1.

In contrast to this, the on-vehicle communication system according to the embodiment of the present disclosure solves the above problem by the configurations and operations described below.

[Configuration of Switch Device]

Figure 2:
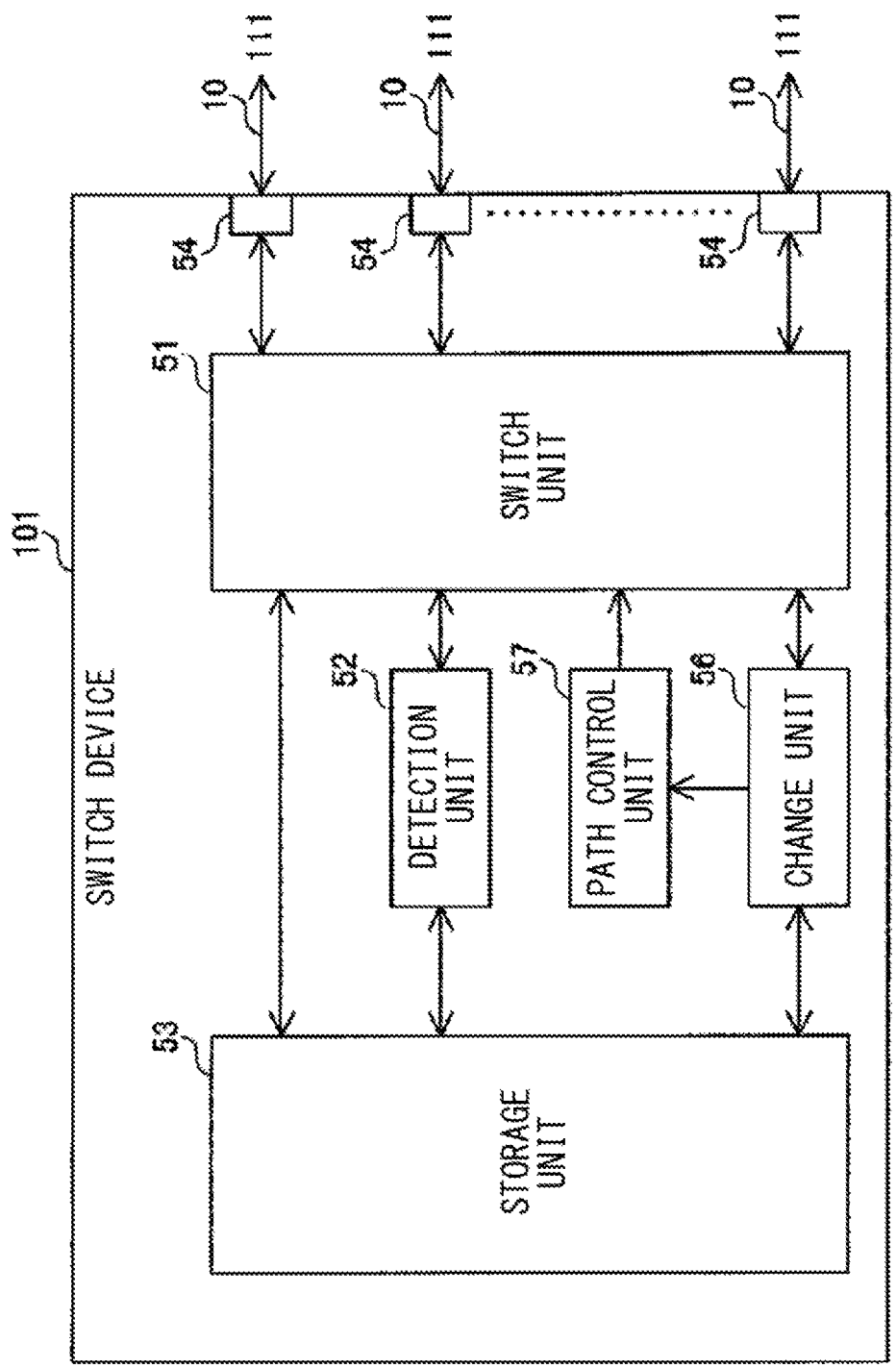
FIG. 2 shows a configuration of a switch device according to the embodiment of the present disclosure.

FIG. 2 shows a configuration of the switch device according to the embodiment of the present disclosure.

With reference to FIG. 2, the switch device 101 includes a switch unit 51, a detection unit 52, a storage unit 53, a plurality of communication ports 54, a change unit 56, and a path control unit 57.

More specifically, the switch device 101A shown in FIG. 1 includes a switch unit 51A, a detection unit 52A, a storage unit 53A, a plurality of communication ports 54A, a change unit 56A, and a path control unit 57A. The switch device 101B includes a switch unit 51B, a detection unit 52B, a storage unit 53B, a plurality of communication ports 54B, a change unit 56B, and a path control unit 57B. The switch device 101C includes a switch unit 51C, a detection unit 52C, a storage unit 53C, a plurality of communication ports 54C, a change unit 56C, and a path control unit 57C.

The switch unit 51 relays an Ethernet frame between a plurality of function units 111 mounted to the vehicle 1.

More specifically, the switch unit 51 operates as an L2 (layer 2) switch, and relays an Ethernet frame between function units 111 belonging to the same VLAN.

Specifically, the switch unit 51 holds an address table indicating a correspondence relationship between the port number of each communication port 54, a VLAN ID, and a MAC address of a connection destination device, for example.

For example, when the switch unit 51 has received an Ethernet frame from a function unit 111, the switch unit 51 stores the received Ethernet frame into the storage unit 53, and confirms the destination MAC address of the Ethernet frame.

The switch unit 51 specifies a communication port 54 corresponding to the confirmed destination MAC address, with reference to the address table.

Then, the switch unit 51 acquires the Ethernet frame from the storage unit 53, and transmits the acquired Ethernet frame to the destination function unit 111 via the specified communication port 54.

In addition, the switch unit 51 operates as an L3 (layer 3) switch or an L4 (layer 4) switch, for example, and relays communication data between function units 111 belonging to different VLANs.

Specifically, the switch unit 51 holds a network table indicating a correspondence relationship between a VLAN ID and a network address, for example. The switch unit 51 holds, for each VLAN ID, an ARP (Address Resolution Protocol) table indicating a correspondence relationship between an IP address and a MAC address, for example.

For example, in the switch device 101A, when the switch unit 51A has received an Ethernet frame from the function unit 111A, the switch unit 51A confirms that the destination MAC address is the MAC address of the switch device 101A, and takes out an IP packet from the received Ethernet frame.

With reference to the network table, the switch unit 51A specifies the ID of the VLAN corresponding to the destination IP address included in the IP packet.

Then, with reference to an ARP table corresponding to the specified VLAN ID, the switch unit 51A acquires the MAC address of the gateway of the VLAN corresponding to the destination IP address.

The switch unit 51A creates an Ethernet frame that includes the acquired MAC address as the destination MAC address and that includes the IP packet, and stores the Ethernet frame into the storage unit 53A.

With reference to the address table, the switch unit 51A specifies a communication port 54 corresponding to the destination MAC address, i.e., the communication port 54 connected to the switch device 101B.

Then, the switch unit 51A acquires the Ethernet frame from the storage unit 53A, and transmits the acquired Ethernet frame to the switch device 101B via the specified communication port 54.

The switch device 101B operates as an L2 switch for the Ethernet frame transmitted from the switch device 101A, and relays the Ethernet frame to the function unit 111C.

The detection unit 52 detects an abnormality regarding the function unit 111. In the following, abnormality detections 1 to 3, which are examples of abnormality detection performed by the detection unit 52, are described. Hereinafter, the function unit 111 for which an abnormality has been detected is also referred to as an abnormality function unit.

[Abnormality Detection 1]

For example, when transmission/reception of predetermined information according to TCP (Transmission Control Protocol) with respect to a function unit 111 has failed, the detection unit 52 determines that the function unit 111 has a TCP abnormality.

More specifically, when the switch device 101A shown in FIG. 1 communicates with the function unit 111C by using TCP, the switch device 101A performs connection confirmation by 3-way handshaking, for example.

Specifically, the switch unit 51A in the switch device 101A generates an Ethernet frame that includes the IP address of the function unit 111C as the destination IP address and that includes an IP packet in which the SYN flag bit in the TCP header is "1" (hereinafter, also referred to as "SYN packet"), and transmits the generated Ethernet frame to the switch device 101B.

The switch device 101B relays the Ethernet frame transmitted from the switch device 101A, to the function unit 111C.

When the function unit 111C has received, via the switch device 101B, the Ethernet frame including the SYN packet transmitted from the switch device 101A, the function unit 111C generates an Ethernet frame that includes the IP address of the switch device 101A as the destination IP address and that includes an IP packet in which the SYN flag bit and the ACK flag bit are "1" (hereinafter, also referred to as "SYN ACK packet"), and transmits the Ethernet frame to the switch device 101B.

The switch device 101B relays the Ethernet frame transmitted from the function unit 111C, to the switch device 101A.

The switch unit 51A in the switch device 101A receives, via the switch device 101B, the Ethernet frame including the SYN ACK packet transmitted from the function unit 111C, and stores the received Ethernet frame into the storage unit 53A.

Upon acquiring the SYN ACK packet included in the Ethernet frame stored in the storage unit 53A, the switch unit 51A generates an Ethernet frame that includes the IP address of the function unit 111C as the destination IP address and that includes an IP packet in which the ACK flag bit in the TCP header is "1" (hereinafter, also referred to as "ACK packet"), and transmits the generated Ethernet frame to the switch device 101B.

The switch device 101B relays the Ethernet frame transmitted from the switch device 101A, to the function unit 111C.

For example, when the switch unit 51A cannot acquire an SYN ACK packet even after a lapse of a predetermined time since the transmission of the SYN packet, the switch unit 51A determines that 3-way handshaking has failed. Then, the switch unit 51A outputs, to the detection unit 52A, the IP address of the function unit 111C, which is the counterpart for which connection confirmation and TCP abnormality notification indicating a TCP abnormality are performed.

Upon receiving the TCP abnormality notification from the switch unit 51A, the detection unit 52A generates an OAM frame for notifying the function unit 111C, which is an abnormality function unit, of the TCP abnormality.

FIG. 3 shows an example of the OAM frame to be used by the switch device according to the embodiment of the present disclosure.

With reference to FIG. 3, the OAM frame is formed by 12 Symbols, i.e., Symbol 0 to Symbol 11. The data string of one Symbol is composed of 8 bits.

Reserved data and various predetermined data are stored in Symbol 0 and Symbol 1.

In the message field of Symbol 2 to Symbol 9, a user can set arbitrary data, for example.

A CRC (cyclic redundancy check), which is a data string to be used in error detection, is stored in Symbol 10 and Symbol 11.

Using the message field in the OAM frame, the detection unit 52A notifies the switch device 101B connected to the function unit 111C, of the abnormality.

More specifically, the detection unit 52A generates an OAM frame that includes a TCP abnormality notification and the IP address of the function unit 111C in the message field, and outputs the OAM frame to the switch unit 51A.

With reference to the network table, the switch unit 51A specifies the ID of the VLAN corresponding to the IP address included in the OAM frame received from the detection unit 52A.

Then, with reference to the ARP table corresponding to the specified VLAN ID, the switch unit 51A acquires the MAC address of the switch device 101B, which is the gateway of the VLAN corresponding to the IP address.

The switch unit 51A creates an Ethernet frame that includes the acquired MAC address as the destination MAC address and that includes the OAM frame, and stores the Ethernet frame into the storage unit 53A.

With reference to the address table, the switch unit 51A specifies a communication port 54A corresponding to the destination MAC address, i.e., the communication port 54A connected to the switch device 101B.

Then, the switch unit 51A acquires the Ethernet frame from the storage unit 53A, and transmits the acquired Ethernet frame to the switch device 101B via the specified communication port 54A.

The switch unit 51B in the switch device 101B receives the Ethernet frame transmitted from the switch device 101A, and stores the received Ethernet frame into the storage unit 53B.

When an abnormality has been detected by the detection unit 52, the change unit 56 performs a protocol change process that causes the function unit 111 for which the abnormality has been detected, to change the protocol that is used.

For example, as the protocol change process, the change unit 56B causes the function unit 111C determined to have a TCP abnormality, to change the protocol that is used, to another protocol that is used in the same layer out of the plurality of layers.

More specifically, when an OAM frame is included in the Ethernet frame stored in the storage unit 53B, the change unit 56B acquires the TCP abnormality notification and the IP address of the function unit 111C included in the OAM frame.

Upon acquiring the TCP abnormality notification, the change unit 56B generates an IP packet that includes the also—acquired IP address of the function unit 111C as the destination IP address and that includes a protocol change request PC1 for causing the protocol used by the function unit 111C to be changed to UDP (User Datagram Protocol), for example. Then, the change unit 56B outputs the IP packet to the switch unit 51B.

With reference to the network table, the switch unit 51B specifies the ID of the VLAN corresponding to the IP address included in the IP packet received from the change unit 56B.

Then, with reference to the ARP table corresponding to the specified VLAN ID, the switch unit 51B acquires the MAC address of the function unit 111C, which is the MAC address of the function unit 111 corresponding to the IP address.

The switch unit 51B creates an Ethernet frame that includes the acquired MAC address of the function unit 111C as the destination MAC address and that includes the IP packet, and stores the Ethernet frame into the storage unit 53B.

With reference to the address table, the switch unit 51B specifies a communication port 54B corresponding to the destination MAC address.

Then, the switch unit 51B acquires the Ethernet frame from the storage unit 53B, and transmits the acquired Ethernet frame to the function unit 111C via the specified communication port 54B.

Upon receiving the protocol change request PC1 included in the Ethernet frame transmitted from the switch device 101B, the function unit 111C changes the protocol used by the function unit 111C, from TCP to UDP.

Abnormality Detection Example 2

For example, when predetermined information in response to a ping (Packet INternet Groper) transmitted to a function unit 111 by the switch device 101 cannot be received from the function unit 111, the detection unit 52 determines that the function unit 111 has a ping abnormality.

More specifically, for example, as a connection confirmation method performed in L3, the switch device 101A shown in FIG. 1 periodically performs connection confirmation with respect to the function unit 111C by using a ping command.

Specifically, the switch unit 51A generates an Ethernet frame that includes the IP address of the function unit 111C as the destination IP address and an echo request of ICMP (Internet Control Message Protocol), and transmits the generated Ethernet frame to the switch device 101B.

The switch device 101B relays the Ethernet frame transmitted from the switch device 101A, to the function unit 111C.

Upon receiving, via the switch device 101B, the echo request included in the Ethernet frame transmitted from the switch device 101A, the function unit 111C generates an Ethernet frame that includes the IP address of the switch device 101A as the destination IP address and an echo reply, and transmits the Ethernet frame to the switch device 101B.

The switch device 101B relays the Ethernet frame transmitted from the function unit 111C, to the switch device 101A.

The switch unit 51A in the switch device 101A receives, via the switch device 101B, the Ethernet frame including the echo reply transmitted from the function unit 111C, and stores the received Ethernet frame into the storage unit 53A.

The switch unit 51A acquires the echo reply included in the Ethernet frame stored in the storage unit 53A.

For example, when the switch unit 51A cannot acquire an echo reply even after a lapse of a predetermined time since the transmission of the echo request, or when the switch unit 51A cannot receive a new Ethernet frame from the function unit 111C even after a lapse of a predetermined time since the acquisition of an echo reply, the switch unit 51A determines that there is a ping abnormality in which communication with the function unit 111C cannot be performed. Then, the switch unit 51A outputs, to the detection unit 52A, a ping abnormality notification indicating a ping abnormality and the IP address of the function unit 111 serving as the counterpart of the connection confirmation, i.e., of the abnormality function unit.

Upon receiving the ping abnormality notification from the switch unit 51A, the detection unit 52A generates an OAM frame for notifying the function unit 111C, which is the abnormality function unit, of the ping abnormality.

Using the message field in the OAM frame, the detection unit 52A notifies the switch device 101B connected to the function unit 111C, of the abnormality.

More specifically, the detection unit 52A generates an OAM frame that includes a ping abnormality notification and the IP address of the function unit 111C in the message field, and outputs the OAM frame to the switch unit 51A.

With reference to the network table, the switch unit 51A specifies the ID of the VLAN corresponding to the IP address included in the OAM frame received from the detection unit 52A.

Then, with reference to the ARP table corresponding to the specified VLAN ID, the switch unit 51A acquires the MAC address of the switch device 101B, which is the gateway of the VLAN corresponding to the IP address.

The switch unit 51A creates an Ethernet frame that includes the acquired MAC address as the destination MAC address and that includes the OAM frame, and stores the Ethernet frame into the storage unit 53A.

With reference to the address table, the switch unit 51A specifies a communication port 54A corresponding to the destination MAC address, i.e., the communication port 54A connected to the switch device 101B.

Then, the switch unit 51A acquires the Ethernet frame from the storage unit 53A, and transmits the acquired Ethernet frame to the switch device 101B via the specified communication port 54A.

The switch unit 51B in the switch device 101B receives the Ethernet frame transmitted from the switch device 101A, and stores the received Ethernet frame into the storage unit 53B.

When an abnormality has been detected by the detection unit 52, the change unit 56 performs a protocol change process that causes the function unit 111 for which the abnormality has been detected, to change the protocol that is used.

More specifically, when an OAM frame is included in the Ethernet frame stored in the storage unit 53B, the change unit 56B acquires the ping abnormality notification and the IP address of the function unit 111C included in the OAM frame.

For example, as the change process, the change unit 56B causes the function unit 111 determined to have a ping abnormality, to perform communication according to a protocol used in a layer, out of the plurality of layers, at an order lower than that of the protocol being used by the function unit 111.

Upon acquiring the ping abnormality notification, the change unit 56B generates an IP packet that includes the also—acquired IP address of the function unit 111C as the destination IP address and that includes a protocol change request PC2 for causing the protocol used by the function unit 111C to be changed to a protocol used in L2 which is a lower order layer. Then, the change unit 56B outputs the IP packet to the switch unit 51B.

With reference to the network table, the switch unit 51B specifies the ID of the VLAN corresponding to the IP address included in the IP packet received from the change unit 56B.

Then, with reference to the ARP table corresponding to the specified VLAN ID, the switch unit 51B acquires the MAC address of the function unit 111C, which is the MAC address of the function unit 111 corresponding to the IP address.

The switch unit 51B creates an Ethernet frame that includes the acquired MAC address of the function unit 111C as the destination MAC address and that includes the IP packet, and stores the Ethernet frame into the storage unit 53B.

With reference to the address table, the switch unit 51B specifies a communication port 54B corresponding to the destination MAC address.

Then, the switch unit 51B acquires the Ethernet frame from the storage unit 53B, and transmits the acquired Ethernet frame to the function unit 111C via the specified communication port 54B.

Upon receiving the protocol change request PC2 included in the Ethernet frame transmitted from the switch device 101B, the function unit 111C changes the protocol used by the function unit 111C, to a protocol used in L2.

Abnormality Detection Example 3

For example, the detection unit 52 detects a communication abnormality which is an abnormality in the communication path between the switch device 101 to which the detection unit 52 belongs and another switch device 101.

More specifically, for example, the switch device 101A shown in FIG. 1 monitors communication quality in the communication path with respect to a function unit 111, by using an SQI (Signal Quality Indicator) that indicates communication quality.

For example, in the switch device 101A, when the switch unit 51A has received an Ethernet frame transmitted from the switch device 101B, the switch unit 51A calculates an SQI on the basis of the received Ethernet frame.

When the calculated SQI is a predetermined value or lower, the switch unit 51A determines that there is a communication abnormality, and outputs a communication abnormality notification indicating a communication abnormality, to the detection unit 52A.

At this time, the switch unit 51A acquires the transmission source MAC address from the received Ethernet frame, and outputs the transmission source MAC address to the detection unit 52A.

The detection unit 52A generates an OAM frame that includes, in the message field, the communication abnormality notification received from the switch unit 51A, and outputs the generated OAM frame and the transmission source MAC address received from the switch unit 51A, to the switch unit 51A.

The switch unit 51A creates an Ethernet frame that includes the transmission source MAC address received from the detection unit 52A as the destination MAC address and that includes the OAM frame, and stores the Ethernet frame into the storage unit 53A.

With reference to the address table, the switch unit 51A specifies a communication port 54A corresponding to the destination MAC address, i.e., the communication port 54A connected to the switch device 101B.

Then, the switch unit 51A acquires the Ethernet frame from the storage unit 53A, and transmits the acquired Ethernet frame to the switch device 101B via the specified communication port 54A.

The switch unit 51B in the switch device 101B receives the Ethernet frame transmitted from the switch device 101A, and stores the received Ethernet frame into the storage unit 53B.

More specifically, when an OAM frame is included in the Ethernet frame stored in the storage unit 53B, the change unit 56B acquires the communication abnormality notification included in the OAM frame.

The change unit 56B outputs the acquired communication abnormality notification to the path control unit 57B.

The path control unit 57 performs a path change process of switching the communication path for which the communication abnormality has been detected, to another communication path that passes through a different switch device 101C.

More specifically, upon receiving the communication abnormality notification from the change unit 56B, the path control unit 57B acquires the MAC address of the switch device 101A as the transmission source MAC address, from the Ethernet frame stored in the storage unit 53B.

Then, the path control unit 57B outputs, to the switch unit 51B, a transmission prohibition request indicating that transmission of an Ethernet frame to the switch device 101A is prohibited.

Upon receiving the transmission prohibition request from the path control unit 57B, the switch unit 51B performs a process of, in an Ethernet frame received from a function unit 111 connected to the switch unit 51B in which the destination MAC address of the Ethernet frame is the MAC address of the switch device 101A, rewriting the destination MAC address to the MAC address of the switch device 101C, for example.

Hereinafter, each of the TCP abnormality notification, the ping abnormality notification, and the communication abnormality notification is also referred to simply as an abnormality notification.

[Operation Flow]

Each of the devices in the on-vehicle communication system 301 includes a computer. An arithmetic processing unit such as a CPU in the computer reads out a program including a part or all of steps in the sequence diagram or flow chart described below from a memory (not shown), and executes the program. The programs for the plurality of devices can be installed from outside. The programs for the plurality of devices are each distributed in a state of being stored in a storage medium.

Figure 4:
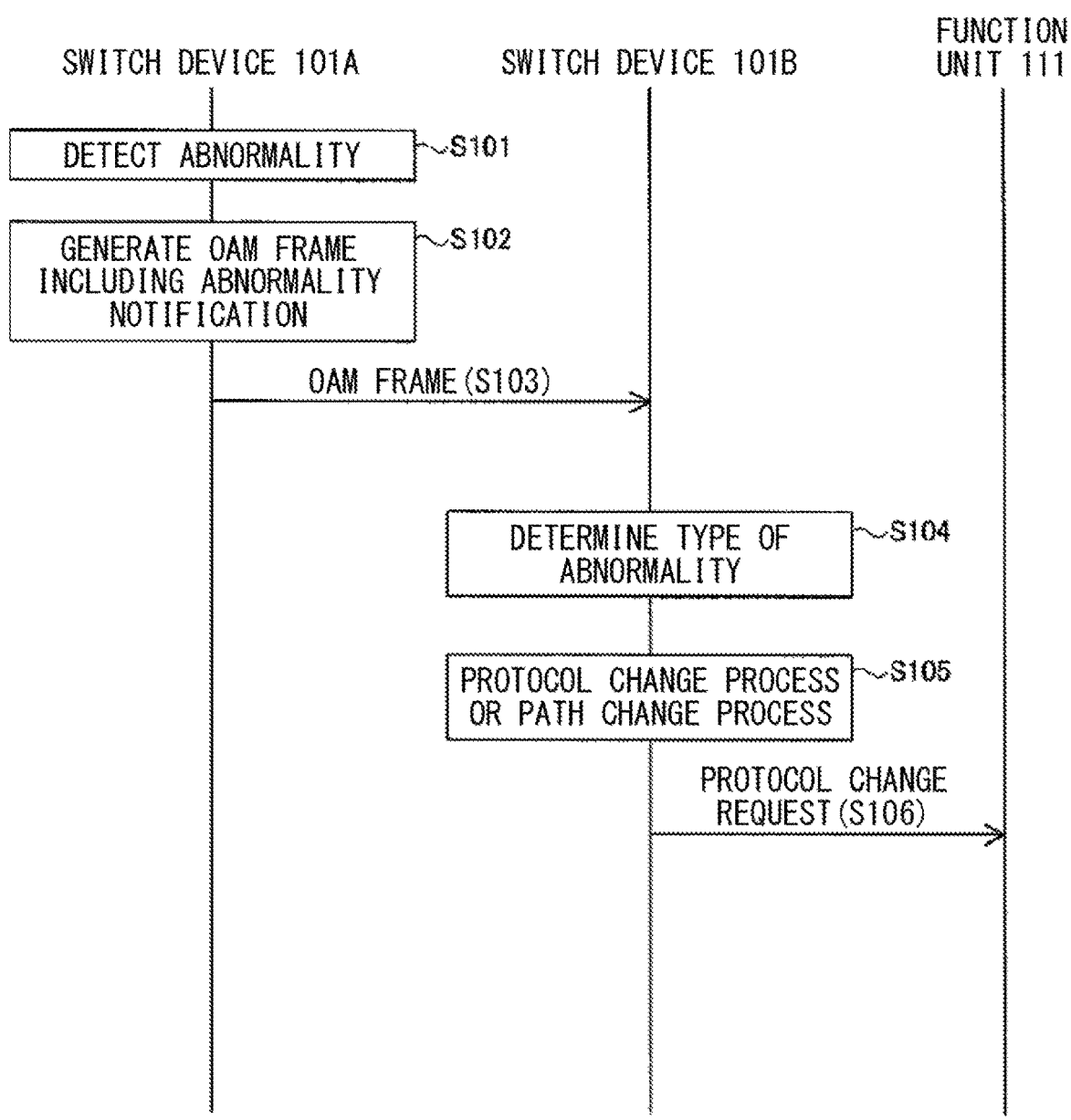
FIG. 4 shows a sequence in which: the switch device according to the embodiment of the present disclosure detects an abnormality regarding a function unit; and a change process is performed for the function unit for which the abnormality has been detected.

FIG. 4 shows a sequence in which: the switch device according to the embodiment of the present disclosure detects an abnormality regarding a function unit; and the change process is performed for the function unit for which the abnormality has been detected. FIG. 4 representatively shows a process performed in the switch device 101A and the switch device 101B.

With reference to FIG. 4, first, the switch device 101A detects an abnormality regarding a function unit 111 (step S101).

Next, the switch device 101A generates an OAM frame including an abnormality notification indicating various types of abnormality (step S102).

Next, the switch device 101A transmits the generated OAM frame to the switch device 101B (step S103).

Next, the switch device 101B determines the type of the abnormality on the basis of the type of the abnormality notification from the received OAM frame (step S104).

Next, the switch device 101B performs the protocol change process or the path change process in accordance with the determined type of the abnormality (step S105).

Next, when performing the protocol change process, the switch device 101B transmits a protocol change request to the function unit 111 for which the abnormality has been detected (step S106).

Similarly, every time a new abnormality regarding the function unit 111 is detected in the switch device 101A, the switch device 101A and the switch device 101B perform the operations of step S101 to step S106.

Figure 5:
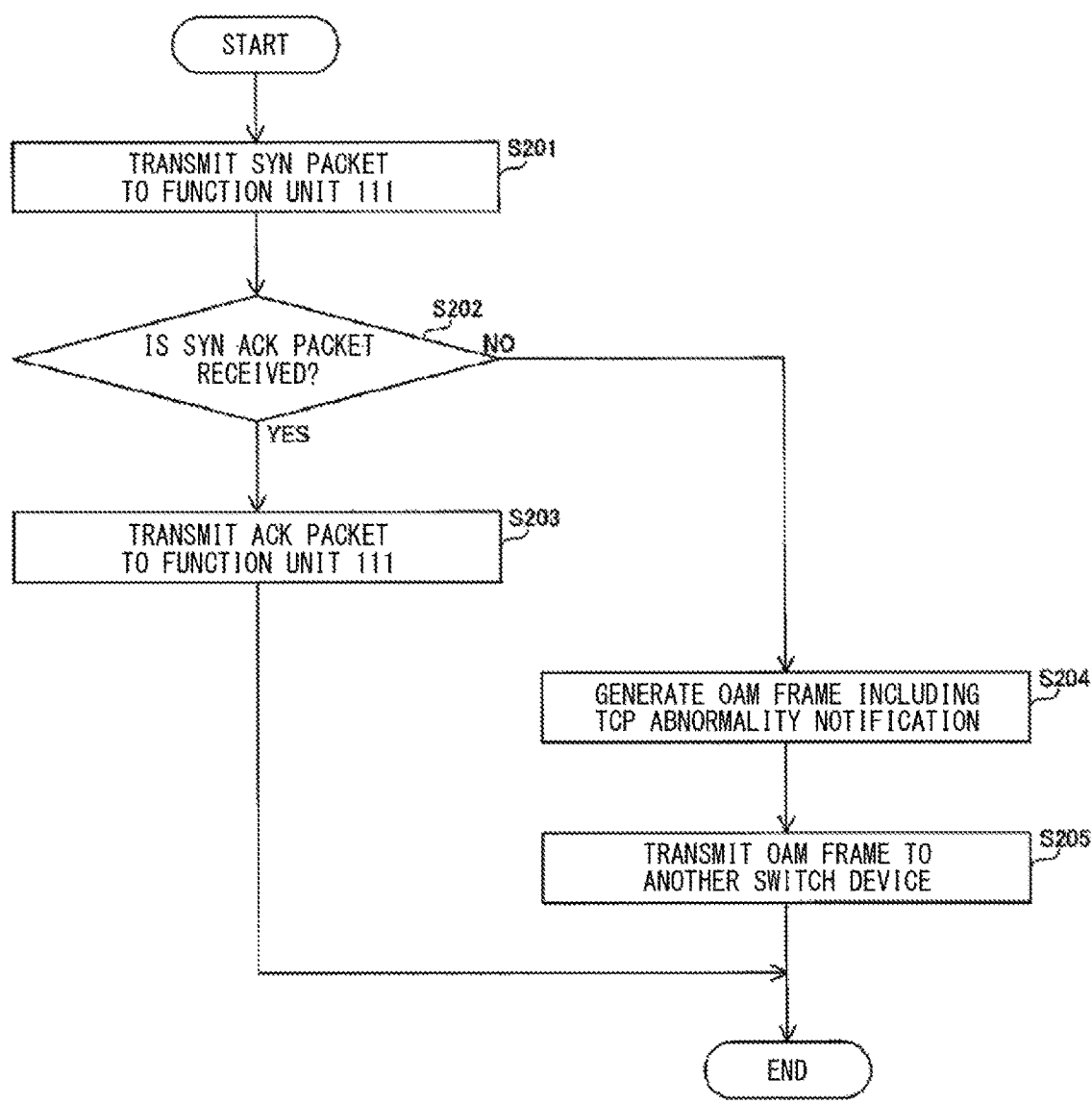
FIG. 5 is a flow chart describing an operation procedure according to which the switch device according to the embodiment of the present disclosure determines presence/absence of a TCP abnormality.

FIG. 5 is a flow chart describing an operation procedure according to which the switch device according to the embodiment of the present disclosure determines presence/absence of a TCP abnormality. FIG. 5 shows details of the operations of step S101 to step S103 shown in FIG. 4.

With reference to FIG. 5, first, when performing communication with a function unit 111 by using TCP, the switch device 101 transmits an SYN packet to the function unit 111 (step S201).

Next, the switch device 101 waits for an SYN ACK packet as a response (step S202).

Next, when having received the SYN ACK packet (YES in step S202), the switch device 101 transmits an ACK packet to the function unit 111 (step S203).

Meanwhile, when the switch device 101 cannot receive an SYN ACK packet even after a lapse of a predetermined time since the transmission of the SYN packet (NO in step S202), the switch device 101 generates an OAM frame including a TCP abnormality notification (step S204), and transmits the OAM frame to another switch device 101 (step S205).

Figure 6:
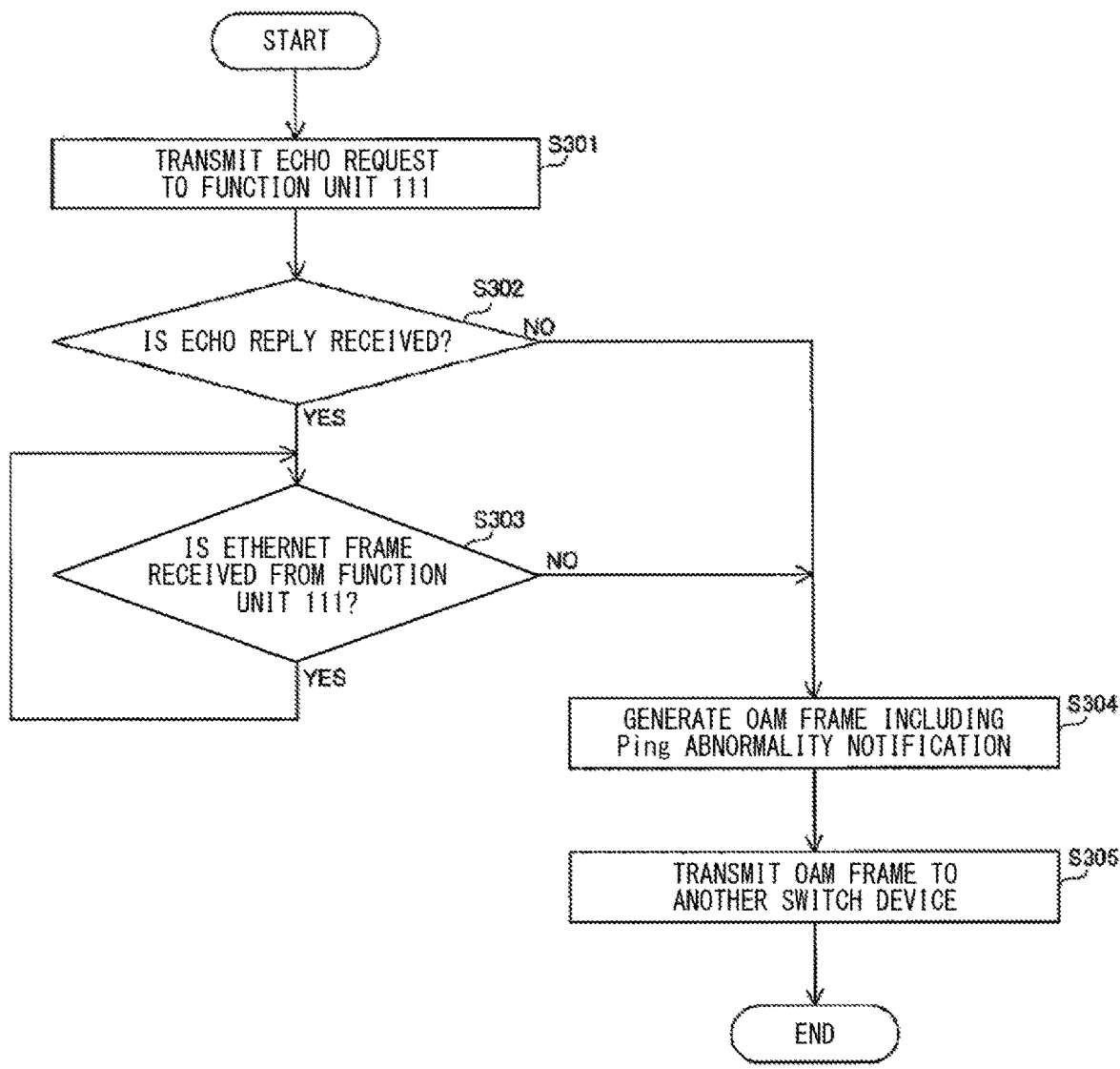
FIG. 6 is a flow chart describing an operation procedure according to which the switch device according to the embodiment of the present disclosure determines presence/absence of a ping abnormality.

FIG. 6 is a flow chart describing an operation procedure according to which the switch device according to the embodiment of the present disclosure determines presence/absence of a ping abnormality. FIG. 6 shows details of the operations of step S101 to step S103 shown in FIG. 4.

With reference to FIG. 6, first, the switch device 101 transmits an echo request to a function unit 111 (step S301).

Next, the switch device 101 waits for an echo reply as a response (step S302).

Next, when having received the echo reply (YES in step S302), the switch device 101 waits for the next Ethernet frame from the function unit 111 (step S303).

Next, when having received an Ethernet frame from the function unit 111 (YES in step S303), the switch device 101 waits for a new Ethernet frame from the function unit 111 (step S303).

Meanwhile, when the switch device 101 cannot receive an echo reply even after a lapse of a predetermined time since the transmission of the echo request (NO in step S302), or when the switch device 101 cannot receive a new Ethernet frame from the function unit 111 even after a lapse of a predetermined time since the reception of the echo reply (NO in step S303), the switch device 101 generates an OAM frame including a ping abnormality notification (step S304), and transmits the OAM frame to another switch device 101 (step S305).

Figure 7:
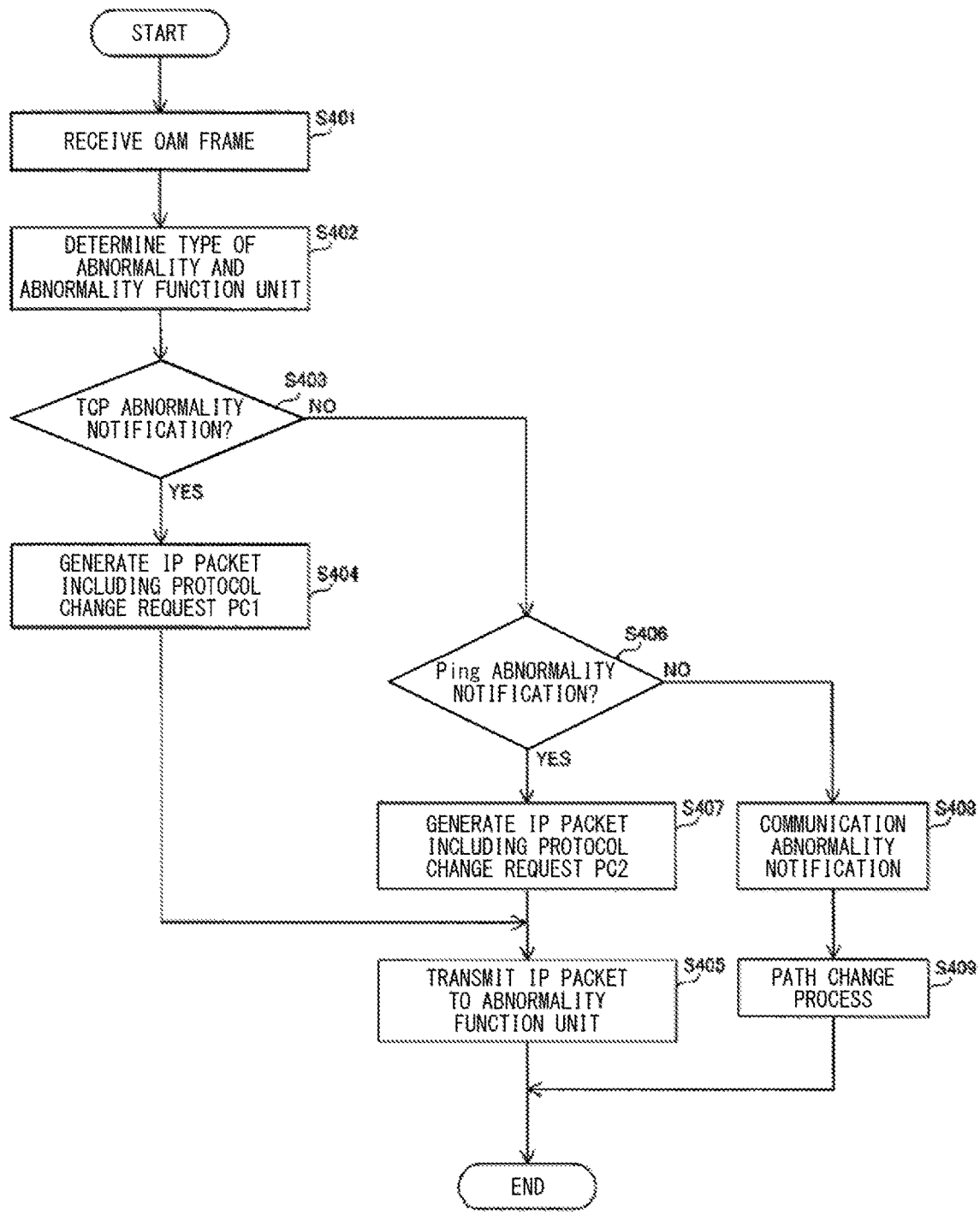
FIG. 7 is a flow chart describing an operation procedure according to which the switch device according to the embodiment of the present disclosure performs a change process.

FIG. 7 is a flow chart describing an operation procedure according to which the switch device according to the embodiment of the present disclosure performs the change process. FIG. 7 shows details of the operations of step S104 to step S106 shown in FIG. 4.

With reference to FIG. 7, first, the switch device 101 receives an OAM frame including an abnormality notification from another switch device 101 (step S401).

Next, the switch device 101 determines the type of the abnormality and the abnormality function unit, on the basis of the type of the abnormality notification and the IP address included in the OAM frame (step S402).

Next, when a TCP abnormality notification is included in the OAM frame (YES in step S403), the switch device 101 generates an Ethernet frame including a protocol change request PC1 (step S404), and transmits the Ethernet frame to the abnormality function unit (step S405).

Meanwhile, when the TCP abnormality notification is not included in the OAM frame (NO in step S403) and a ping abnormality notification is included in the OAM frame (YES in step S406), the switch device 101 generates an Ethernet frame including a protocol change request PC2 (step S407), and transmits the Ethernet frame to the abnormality function unit (step S405).

Meanwhile, when the TCP abnormality notification is not included in the OAM frame (NO in step S403) and the ping abnormality notification is not included in the OAM frame (NO and step S406), i.e., when a communication abnormality notification is included in the OAM frame (step S408), the switch device 101 performs the path change process (step S409).

The switch device in the on-vehicle communication system according to the embodiment of the present disclosure performs the abnormality detections 1 to 3. However, the present disclosure is not limited thereto. The switch device 101 may perform part of the abnormality detections 1 to 3.

In the switch device in the on-vehicle communication system according to the embodiment of the present disclosure, the change unit 56B causes the function unit 111C determined to have a TCP abnormality, to change the protocol that is used, to another protocol that is used in the same layer out of a plurality of layers. However, the present disclosure is not limited thereto. The change unit 56B may cause the function unit 111C determined to have a TCP abnormality, to perform communication according to a protocol used in a layer, out of the plurality of layers, at an order lower than that of the protocol being used by the function unit 111C.

In the switch device in the on-vehicle communication system according to the embodiment of the present disclosure, the change unit 56B causes the function unit 111C determined to have a TCP abnormality, to change the protocol that is used, to another protocol that is used in the same layer out of a plurality of layers. However, the present disclosure is not limited thereto. The detection unit 52 may detect an abnormality other than the TCP abnormality, and the protocol that is used may be caused to be changed to another protocol that is used in the same layer out of the plurality of layers.

In the switch device in the on-vehicle communication system according to the embodiment of the present disclosure, the change unit 56B causes the function unit 111C determined to have a ping abnormality, to perform communication according to a protocol that is used in a layer, out of the plurality of layers, at an order lower than that of the protocol being used by the function unit 111C. However, the present disclosure is not limited thereto. The detection unit 52 may detect an abnormality other than the ping abnormality, and communication may be caused to be performed according to a protocol that is used in a layer, out of the plurality of layers, at an order lower than that of the protocol being used by the function unit 111C.

In the on-vehicle communication system according to the embodiment of the present disclosure, the vehicle 1 performs automated driving. However, the present disclosure is not limited thereto. The vehicle 1 may not necessarily perform automated driving.

In the on-vehicle communication system according to the embodiment of the present disclosure, the switch device 101A detects an abnormality regarding the function unit 111, and the switch device 101B performs the protocol change process. However, the present disclosure is not limited thereto. For example, the switch device 101B may detect an abnormality regarding the function unit 111 and perform the protocol change process. In this case, in the switch device 101B, the detection unit 52B detects an abnormality regarding the function unit 111, and the change unit 56B performs the protocol change process.

Meanwhile, for example, as a method for detecting an abnormality of an on-vehicle ECU in the on-vehicle network described in PATENT LITERATURE 1, a method in which a communication gateway detects an abnormality of an on-vehicle ECU is conceivable.

However, even when an abnormality of an on-vehicle ECU has been detected, if recovery of the on-vehicle ECU takes time, the abnormal state continues, which could cause problems in processing of data to be used in driving support or automated driving.

In contrast to this, in the on-vehicle communication system according to the embodiment of the present disclosure, the detection unit 52 detects an abnormality regarding the function unit 111. When an abnormality has been detected by the detection unit 52, the change unit 56 performs the protocol change process of causing the function unit 111 for which the abnormality has been detected, to change the protocol that is used.

Thus, due to the configuration of causing change of the protocol used by an abnormality function unit, which is a function unit 111 for which an abnormality has been detected, the protocol used in the communication between the abnormality function unit and another function unit 111 can be changed, and the other function unit 111 can communicate with the abnormality function unit in accordance with the protocol after the change. Thus, the communication with the abnormality function unit can be continued.

Therefore, in the on-vehicle communication system according to the embodiment of the present disclosure, stabler processing can be realized in the on-vehicle network.

In the on-vehicle communication system according to the embodiment of the present disclosure, each function unit 111 operates in accordance with a model having a plurality of layers. When transmission/reception of predetermined information according to TCP with respect to a function unit 111 has failed, the detection unit 52 determines that the function unit 111 has a TCP abnormality. As the protocol change process, the change unit 56 causes the function unit 111 determined to have the TCP abnormality, to change the protocol that is used, to another protocol that is used in the same layer out of the plurality of layers.

With this configuration, in a case where there is an abnormality in communication using TCP but communication according to a different protocol can be performed, communication with the abnormality function unit can be continued by using the protocol after the change.

In the on-vehicle communication system according to the embodiment of the present disclosure, the function unit 111 operates in accordance with a model having a plurality of layers. When predetermined information in response to a ping transmitted to a function unit 111 by the switch device 101 cannot be received from the function unit 111, the detection unit 52 determines that the function unit 111 has a ping abnormality. As the protocol change process, the change unit 56 causes the function unit 111 determined to have the ping abnormality, to perform communication according to a protocol that is used in a layer, out of the plurality of layers, at an order lower than that of the protocol being used by the function unit 111.

With this configuration, in a case where communication cannot be performed in the same layer but communication can be performed in a different layer, communication with the abnormality function unit can be continued by using the protocol after the change.

In the on-vehicle communication system according to the embodiment of the present disclosure, the detection unit 52 detects a communication abnormality which is an abnormality in the communication path between the switch device 101 to which the detection unit 52 belongs and another switch device 101. The path control unit 57 performs the path change process of switching the communication path for which the communication abnormality has been detected, to another communication path that passes through a different switch device 101.

With this configuration, data can be transmitted via a different switch device 101, and communication can be continued while the communication path having the communication abnormality is avoided.

In the on-vehicle communication system according to the embodiment of the present disclosure, the vehicle 1 performs automated driving.

With this configuration, communication between function units 111 is allowed to continue in the vehicle 1, whereby automated driving can be stably continued.

In the switch device according to the embodiment of the present disclosure, the switch unit 51 relays data between a plurality of function units 111 mounted to the vehicle 1. The detection unit 52 detects an abnormality regarding a function unit 111. When an abnormality has been detected by the detection unit 52, the change unit 56 performs the protocol change process of causing the function unit 111 for which the abnormality has been detected, to change the protocol that is used.

Thus, due to the configuration of causing change of the protocol used by an abnormality function unit, which is a function unit 111 for which an abnormality has been detected, the protocol used in the communication between the abnormality function unit and another function unit 111 can be changed, and the other function unit 111 can communicate with the abnormality function unit in accordance with the protocol after the change. Thus, the communication with the abnormality function unit can be continued.

Therefore, in the switch device according to the embodiment of the present disclosure, stabler processing can be realized in the on-vehicle network.

In the communication control method according to the embodiment of the present disclosure, first, an abnormality regarding a function unit 111 is detected. Next, when an abnormality regarding the function unit 111 has been detected, the protocol change process is performed of causing the function unit 111 for which the abnormality has been detected, to change the protocol that is used.

Thus, due to the configuration of causing change of the protocol used by an abnormality function unit, which is a function unit 111 for which an abnormality has been detected, the protocol used in the communication between the abnormality function unit and another function unit 111 can be changed, and the other function unit 111 can communicate with the abnormality function unit in accordance with the protocol after the change. Thus, the communication with the abnormality function unit can be continued.

Therefore, in the communication control method according to the embodiment of the present disclosure, stabler processing can be realized in the on-vehicle network.

The above embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

An on-vehicle communication system comprising:
a switch device configured to relay data between a plurality of function units mounted to a vehicle;
a detection unit configured to detect an abnormality regarding a function unit; and
a change unit configured to, when an abnormality has been detected by the detection unit, perform a protocol change process of causing the function unit for which the abnormality has been detected, to change a protocol that is used, wherein
the detection unit notifies another switch device of the detected abnormality, by using an OAM frame.

[Additional Note 2]

A switch device comprising:
a switch unit configured to relay data between a plurality of function units mounted to a vehicle;
a detection unit configured to detect an abnormality regarding a function unit; and
a change unit configured to, when an abnormality has been detected by the detection unit, perform a protocol change process of causing the function unit for which the abnormality has been detected, to change a protocol that is used, wherein
the detection unit notifies another switch device of the detected abnormality, by using an OAM frame.

REFERENCE SIGNS LIST

1 vehicle
10 Ethernet cable
51 switch unit
52 detection unit
53 storage unit
54 communication port
56 change unit
57 path control unit
101 switch device
111 function unit
301 on-vehicle communication system

The invention claimed is:

1. An on-vehicle communication system comprising:
a first switch device and a second switch device each configured to relay data between a plurality of function units mounted to a vehicle, wherein
the first switch device includes a processor and is programmed to:
detect a first abnormality regarding a function unit;
generate an OAM frame including abnormality information indicating the detected first abnormality and address of the function unit where the first abnormality has been detected;
transmit the generated OAM frame to the second switch device, and
the second switch device includes a processor and is programmed to:
receive the OAM frame transmitted from the first switch device;
when the first abnormality has been detected by the first switch device, perform, based on the received OAM frame, a communication protocol change process of causing the function unit for which the first abnormality has been detected, to change a communication protocol that is used from a first communication protocol to a second communication protocol different from the first communication protocol; and when a second abnormality different from the first abnormality has been detected by the first switch device, not perform the communication protocol change process and perform a communication path change process of switching a communication path to the function unit, from a first communication path via the first switch device to a second communication path via a third switch device different from the first switch device.

2. The on-vehicle communication system according to claim 1, wherein each function unit operates in accordance with a model having a plurality of layers, when transmission/reception of predetermined information according to TCP (Transmission Control Protocol) with respect to the function unit has failed, the first switch device determines that the function unit has a TCP abnormality, and as the communication protocol change process, the second switch device causes the function unit determined to have the TCP abnormality, to change the first communication protocol that is used, to the second communication protocol, which is used in the same layer out of the plurality of layers.

3. The on-vehicle communication system according to claim 1, wherein each function unit operates in accordance with a model having a plurality of layers, when predetermined information in response to a ping (Packet INternet Groper) transmitted to a function unit by the switch device cannot be received from the function unit, the first switch device determines that the function unit has a ping abnormality, and as the communication protocol change process, the second switch device causes the function unit determined to have the ping abnormality, to perform communication according to the second communication protocol, which is used in a layer, out of the plurality of layers, at an order lower than that of the first communication protocol being used by the function unit.

4. The on-vehicle communication system according to claim 1, wherein the vehicle is a vehicle that performs automated driving.

5. A switch device comprising a processor and being programmed to:

relay data between a plurality of function units mounted to a vehicle;

receive, when a first abnormality regarding a function unit has been detected by a first switch device connected to the switch device, an OAM frame including abnormality information indicating the detected first abnormality and address of the function unit where the first abnormality has been detected;

when the first abnormality regarding a function unit has been detected by the first switch device connected to the switch device, perform, based on the received OAM frame, a communication protocol change process of causing the function unit for which the first abnormality has been detected, to change a communication protocol that is used from a first communication protocol to a second communication protocol different from the first communication protocol; and when a second abnormality different from the first abnormality has been detected by the first switch device connected to the switch device, not perform the communication protocol change process and perform a communication path change process of switching a communication path to the function unit, from a first communication path via the first switch device to a second communication path via a third switch device different from the first switch device.

6. A communication control method to be performed in an on-vehicle communication system including a first switch device and a second switch device each configured to relay data between a plurality of function units mounted to a vehicle, the communication control method comprising the steps of:

detecting, by the first switch device, a first abnormality regarding a function unit;

generating, by the first switch device, an OAM frame including abnormality information indicating the detected first abnormality and address of the function unit where the first abnormality has been detected;

transmitting, by the first switch device, the generated OAM frame to the second switch device;

receiving, by the second switch device, the OAM frame transmitted from the first switch device;

performing, based on the received OAM frame, by the second switch device, when the first abnormality regarding the function unit has been detected by the first switch device, a communication protocol change process of causing the function unit for which the first abnormality has been detected, to change a communication protocol that is used from a first communication protocol to a second communication protocol different from the first communication protocol; and not performing the communication protocol change process and performing, by the second switch device, when a second abnormality different from the first abnormality has been detected by the first switch device, a communication path change process of switching a communication path to the function unit, from a first communication path via the first switch device to a second communication path via a third switch device different from the first switch device.

7. A non-transitory computer readable storage medium storing a communication control program to be used in a switch device, the switch device including a computer and configured to relay data between a plurality of function units mounted to a vehicle, the communication control program causing the computer to:

relay data between a plurality of function units mounted to a vehicle, and to receive, when a first abnormality regarding a function unit has been detected by a first switch device connected to the switch device, an OAM frame including abnormality information indicating the detected first abnormality and address of the function unit where the abnormality has been detected;

when the first abnormality regarding a function unit has been detected by the first switch device connected to the switch device, perform, based on the received OAM frame, a communication protocol change process of causing the function unit for which the first abnormality has been detected, to change a communication protocol that is used from a first communication protocol to a second communication protocol different from the first communication protocol; and when a second abnormality different from the first abnormality has been detected by the first switch device connected to the switch device, not perform the communication protocol change process and perform a communication path change process of switching a communication path to the function unit, from a first communication path via the first switch device to a second communication path via a third switch device different from the first switch device.

* * * * *